United States Patent
Loughran et al.

(10) Patent No.: US 7,818,564 B2
(45) Date of Patent: Oct. 19, 2010

(54) DECIPHERING OF FRAGMENTED ENCIPHERED DATA PACKETS

(75) Inventors: Kevin Loughran, Castleblaney (IE); Eoghan Stack, Ballyvolane (IE); Peter Furlong, Dublin (IE); David John Law, Musselburgh (GB)

(73) Assignee: Hewlett-Packard Company, Palo Alto, CA (US)

(*) Notice: Subject to any disclaimer, the term of this patent is extended or adjusted under 35 U.S.C. 154(b) by 1423 days.

(21) Appl. No.: 11/121,231

(22) Filed: May 3, 2005

(65) Prior Publication Data
US 2006/0218390 A1 Sep. 28, 2006

(51) Int. Cl.
*H04L 29/06* (2006.01)

(52) U.S. Cl. ..................................... 713/151
(58) Field of Classification Search ................... 713/151
See application file for complete search history.

(56) References Cited

U.S. PATENT DOCUMENTS

| | | | | |
|---|---|---|---|---|
| 5,161,193 A | * | 11/1992 | Lampson et al. | 713/151 |
| 5,235,644 A | * | 8/1993 | Gupta et al. | 713/161 |
| 5,541,995 A | | 7/1996 | Normile et al. | |
| 5,594,869 A | * | 1/1997 | Hawe et al. | 713/152 |
| 2003/0221116 A1 | * | 11/2003 | Futoransky et al. | 713/189 |
| 2004/0205336 A1 | | 10/2004 | Kessler et al. | |

FOREIGN PATENT DOCUMENTS

EP    1 085 719 A2    3/2001

OTHER PUBLICATIONS

Search Report for Application No. GB 0505938.1, Jul. 7, 2005.

* cited by examiner

*Primary Examiner*—Kambiz Zand
*Assistant Examiner*—Stephen Sanders (57) ABSTRACT

The deciphering of fragmented enciphered IP packets is performed without requiring reassembly of the fragments. fragmented packets. When a first frame is deciphered a characteristic poly-tuple is saved against the state of the cipher, particularly an output vector. When the next frame comes in, the cipher would continue on from that previously saved state after a look-up of the poly-tuple. Each frame would then be sent on, deciphered, but still representing a fragment of the original packet. The poly-tuple employed for the look-up includes the identity and protocol fields from the IP header and at least one of the source IP address and the destination IP address. The deciphering process may commence with the combination of input data with an initializing vector and proceed by combining input data with a vector fed back from the output of the deciphering engine. The saved cipher state is employed as the initializing vector for the next frame.

16 Claims, 5 Drawing Sheets

| Source IP add (32 bit) | Dest IP add (32 bit) | IP ID (13 bit) |
|---|---|---|
| Protocol | Cipher state | Timer |

DECIPHERING OF FRAGMENTED ENCIPHERED DATA PACKETS

FIELD OF THE INVENTION

The present invention relates to communication and computer networks generally and more particularly to the deciphering of enciphered fragmented packets, particularly internet protocol (IP) packets.

BACKGROUND TO THE INVENTION

The successful transmission of messages over a packet-based network is governed by a multiplicity of different protocols which prescribe formats for message data, packets and packets in successive layers of encapsulation.

The 'transport layer' provides logical communication between processes running on different hosts (i.e. source host and destination host). A common transport layer protocol such as TCP (transmission control protocol) provides for such logical communication and a reliable data transfer service in the sense that it ensures ultimately that successive segments of a message are assembled at a destination host in a complete and correct order.

The network layer protocol, of which the most common example is IP (internet protocol) provides for proper addressing of message segments that travel between different networks. The most common form of IP currently is known as IPv4 (IP version 4), and a packet conforming to that version is characterised by a header that includes, among other things, field identifying the version number, the header length, the type of service, the total packet length, an identifier, various flags, an offset, a time-to-live field, an identification of an upper layer protocol, a header check sum and source IP address and a destination IP address, an options field followed by message data.

The third layer under discussion is the link layer, or media access control layer, which governs the transmission of a packet from one device to another in accordance with the link layer addressing of the devices or network cards that a packet will encounter on its route between source and destination.

As will be appreciated, there are in practice additional layers of encapsulation necessitated by such processes as encryption and tunnelling. Both of these processes add, as will be explained with reference to a typical example, substantially to the length occupied by header data in a packet.

It is both theoretically and practically desirable for IP packets to be completely encapsulated each in a single link layer packet for transport from one router to the next. However, the maximum amount of data that a link layer packet can carry, known as the MTU (maximum transfer unit), varies from one link layer protocol to another. For example, 'Ethernet' packets can carry approximately 1500 bytes of data whereas various wide area protocols are limited to a MTU of (for example) 576 bytes. There is a general problem that each link along the route between source and destination might use different link layer protocols and each of these protocols can have different MTUs.

Since the size of an IP packet and the MTU can both vary, sometimes the packet size can exceed the MTU; this is liable to occur when header overheads from encryption and tunnelling are added.

Accordingly, it is known to be necessary, though not desirable, to allow fragmentation of IP packets. If, for example, IPv4 is employed, fragmentation may be performed either at the source or at an intermediate router. To assist in the final reassembly of the fragments of an IP packet, the header prescribed for IPv4 includes, as the $5^{th}$ to $8^{th}$ bytes of the header identification field, a flag field and a fragmentation field. Accordingly, when an IPv4 packet is created, the sending host 'stamps' the packet with an identification number as well as the source and destination addresses. Moreover, the sending host increments the identification number for each packet it sends. When a router needs to fragment a packet into separate frames each resulting 'fragment' is 'stamped' with a source address, destination address and identification number of the original packet, as well as a fragment offset which indicates by how many bytes this fragment is offset from the original packet. Accordingly, when a destination host receives a series of frames from the same sending host, it can examine the identification numbers of the frames to determine which of the frames comprise fragments of the same original packet. Because the internet protocol does not guarantee delivery (being principally an addressing system) one or more of the fragments may never arrive at the destination. For this reason, in order for the destination host to determine that it has received the last fragment of the original packet, it is conventional to set the last fragment with a 'flag' bit set to zero and to set all the other fragments with this flag bit set to 'one'. Further, in order for the destination host to determine whether a fragment is missing, and also to be able to reassemble the fragments in their proper order, an offset field is used to specify where the fragment fits within the original IP packet.

If packets conforming to IPv6 (IP version 6) are employed they would be handled in basically the same manner, although the MTU has to be larger and fragmentation is indicated by a fragmentation extension header rather than by the ordinary header as in IPv4.

Reassembly of fragmented packets is an undesirable and time-consuming process. The difficulties are now compounded by the extensive use of tunnelling, as in virtual private networks (VPNs) and enciphering, for example by means of IP security (IPSEC). For example, one way in which a virtual private network can be organised is to employ packets which use UDP as a transport protocol and a tunnelling protocol such as L2TP and to encapsulate UDP datagrams using an enciphering protocol within packets that can be transported generally, that is to say packets conforming to an internetworking protocol such as IP. The encapsulation may therefore, where the overall internetworking protocol is IP, be an IPSEC protocol such as AH (authentication header) or ESP (encapsulation security protocol).

One effect of the use of tunnelling and/or enciphering is a substantial increase in the size of an IP packet. It is common therefore to find that if such a packet passes through an IPSEC based VPN, the packet will have an added header which causes the packet to exceed the maximum transmission unit, being therefore fragmented into two separate frames. In general, as more networks employ encryption and tunnelling as methods for the secure transmission of data between hosts, the additional security headers used to implement the security scheme result in increased fragmentation.

Packets which have been first encrypted and then fragmented into distinct frames, for example as a result of the extra header length, must currently be defragmented and then decrypted before they may be forwarded to a host. This causes an additional latency in terms of clock cycles. Furthermore, since the defragmenting and reassembly process is usually offloaded to a separate processor, offloading causes substantial overhead and adversely affects the overall throughput.

SUMMARY OF THE INVENTION

The present invention is based on the deciphering of fragmented enciphered IP packets and forwarding the same deciphered but still as fragmented packets. As will be explained in more detail hereinafter, the invention particularly relies on a poly-tuple look-up in an IPSEC engine with a cache memory. Thus when a first frame is deciphered a characteristic poly-tuple (commonly a 4-tuple) would be saved against the state of the cipher. When the next frame comes in, the deciphering would continue on from that previously saved state after a look-up of the poly-tuple. Each frame would then be sent on, deciphered, but still representing a fragment of the original packet.

The poly-tuple employed for the look-up preferably comprises at least the identity and protocol fields from the IP header and preferably also at least one and preferably both of the source IP address and the destination IP address.

The deciphering process may commence with the combination of input data with an initialising vector and proceed by combining input data with a vector fed back from the output of the deciphering engine. The saved cipher state is preferably employed as the initialising vector for the next frame.

Further features and advantages of the invention will be apparent from the following description of a particular example with reference to the drawings.

DETAILED DESCRIPTION

Figure 1:
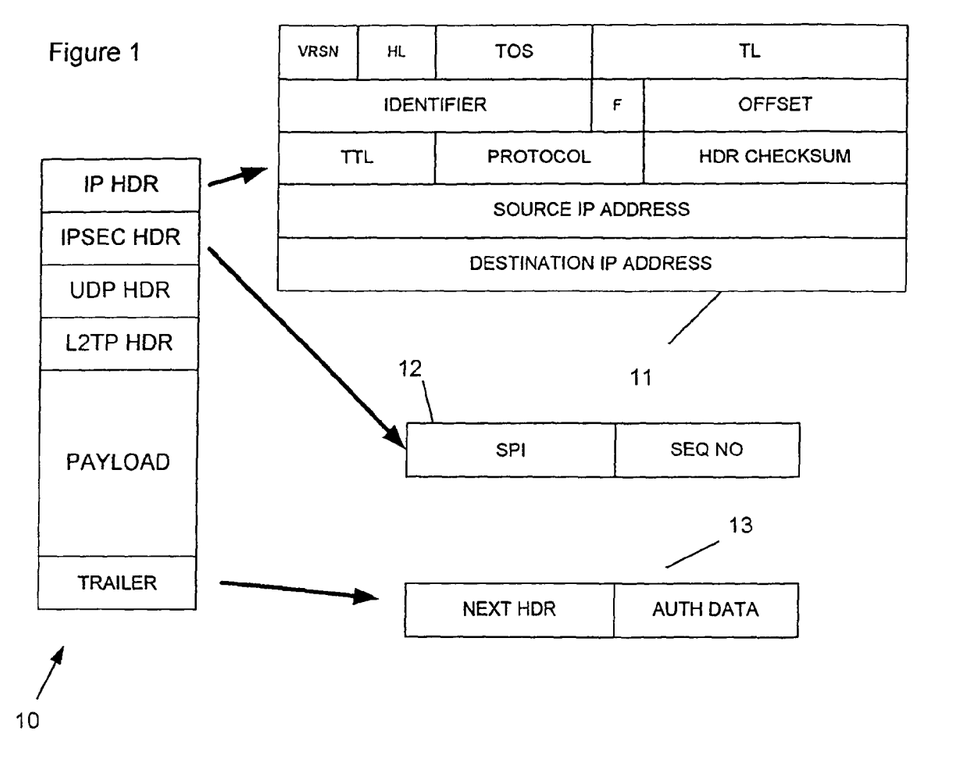
FIG. 1 illustrates a packet of the type which can be handled by the present invention.

In FIG. 1 is shown one example of a IP frame of the kind which can be handled by the present invention. Herein, purely for convenience, the term 'packet' is employed to refer to an original IP packet on its own and the term 'frame' is a generic term used to refer to a datagram which has the same form as a packet but which has a payload that is, or may be, a fragment of the original packet.

In the present example, the IP frame has an IP header (IP HDR) 11 which is shown in more detail in the expanded diagram on the right. In this example the IP header is followed by an IP security header (IPSEC HDR) 12 which defines the enciphering of an encapsulated message, in this example a UDP datagram comprising a UDP header (UDP HDR) followed by an L2TP header (L2TP HDR) and a payload (PAYLOAD). The frame 10 terminates after a security trailer (TRAILER).

The example of a UDP datagram encapsulated within the IP frame is selected because a UDP datagram encapsulating an L2TP header is favoured for tunnelling in virtual private networks. The invention is not limited to this example. For example, the transport layer protocol for the datagram could be TCP.

In order to provide a context for the following description, there follows a description of the IP header 11 and the IPSEC header and trailer fields. In this example the IP header conforms to IPv4 and the IPSEC security protocol is ESP (Encapsulation Security Payload); again, these examples are not intended to be limitations.

The IPv4 header 11 in FIG. 1 has its first four bytes (32 bits) constituted by a version (VRSN) field, a header length field (HL), indicating the length of the IP header, a type of service field (TOS) and a 16-bit field (TL) denoting the total length of the IP frame.

The next four bytes comprise a 16-bit identifier field (IDENTIFIER), a 3-bit flag field F and a 13-bit fragment offset field (OFFSET).

The next four bytes comprise a TTL (time-to-live) field, a protocol field (PROTOCOL) indicating the upper level protocol, and an HDR CHSM field which is checksum field for the IP header.

The next four bytes are a source IP address field (IPSA) and the following four bytes are a destination IP address field (IPDA).

A complete IPv4 header field is followed by an options field (not shown) of no consequence to the present invention.

The IPSEC protocol in this example is ESP. It is characterised by the header 12 and the trailer 13. The ESP header comprises a four-byte SPI field and a four-byte sequence number (SEQ NO). The trailer 13 comprises a Next Header field (NEXT HDR) and an authentication data field (AUTH DATA). It may also comprise, before the NEXT HDR field, padding and a padding length field (not shown); these are customarily employed to ensure alignment of the following fields.

Other security protocols (such as Authentication Header) have similar fields but in different positions. A frame conforming to Authentication Header will not be described in detail because that protocol is not intended to provide confidentiality as well as authentication and message integrity.

The SPI field refers to a security parameter index. As explained hereafter, in combination with the destination IP address and the security protocol it uniquely identifies a security association (SA) for the packet.

The SEQ NO field is a 32-bit field containing a sequence number for each frame. It is initially set to zero at an establishment of a security association.

The 'NEXT HDR' (next header) field performs the role that a protocol field performs for a non-enciphered packet. It indicates whether the message data is a TCP segment, a UDP segment, ICPM segment and so on. The indication is required because the PROTOCOL field in the IP header 11 is given a value that indicates which security protocol is in operation. The number 50 is employed for any ESP protocol and the number 51 is used to indicate an AH protocol. Therefore the PROTOCOL field in the IP header 11 can no longer be used to indicate a transport layer protocol.

The AUTH DATA field is a field which contains containing a signed message digest for the packet. This message digest is calculated over the original IP packet and provides source host authentication and integrity for the IP packet. Conventionally the digest is computed using an algorithm specified by the security association.

For a security protocol such as the ESP source and destination network hosts perform a 'handshake' and create a network logical connection which is known as a 'security association'. The logical connection defined by a security association is a simplex connection, that is to say it is unidirectional. If both hosts wish to send secure packets to each other then two security associations need to be established, one for each direction. A security association is uniquely identified by a 3-tuple consisting of (i) a security protocol identifier; (ii) a network address related to the connection and (iii) the connection identifier, i.e. the security parameter index (SPI). In one form of the ESP protocol the network address specified was that of the source host; but in current practice the network address to be specified is that of the destination host.

Figure 2:
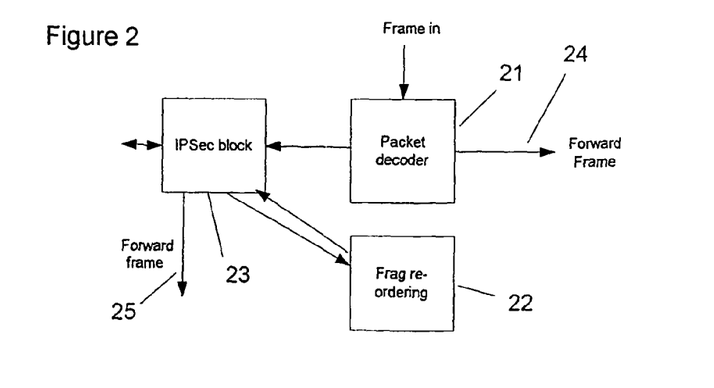
FIG. 2 illustrates schematically the main blocks of one embodiment of the invention.

FIG. 2 illustrates in broad terms a deciphering system according to the invention. A frame is received on an input channel and proceeds to a frame decoder 21. This is of an ordinary form set up to decode the fields of an IP header. The system includes a fragment reordering block 22 and an IP security block 23, which is illustrated in more detail in FIG. 3.

In practice the system may contain an intrusion security block (not shown) which will usually comprise a system for the detection of undesirable digital 'signatures' in the incoming data stream. Such signatures may consist of a string of characters (i.e. ASCII characters). Each string may be tens or hundreds of characters long. The intrusion security block may comprise one or more DFA (deterministic finite-state automata) which store each digital signature as a sequence of states. Each character may be examined in its turn to determine whether the state machine in the DFA transitions from a current state to a next state in a sequence or transitions to a default state. The detection of a signature requires the DFA to execute the sequence corresponding to that signature. One example of a DFA of this type is the subject of co-pending U.S. patent application Ser. No. 11/064,257 for Furlong et al filed Feb. 22, 2005 and commonly assigned herewith.

On the assumption that a received frame conforms to the format shown by way of example in FIG. 1, the decoder 21 in its parsing of the EP header 11 will on encountering the PROTOCOL field determine that the IP frame is enciphered because the protocol field is set to a characteristic number, e.g. to '50', denoting Encryption Security Payload protocol, and will direct the frame to the IPSec block 23. If the frame is not enciphered, it may be forwarded directly as indicated by arrow 24.

The IPSec block 23 receives and buffers the frame and then parses the header to capture the fragment offset field OFFSET, the IP protocol field PROTOCOL, the destination EP address IPSA and, from the IPSEC header, the security parameter index field SPI.

If the fragment offset field is equal to zero, the frame is recognisable as the first fragment of a sequence. Accordingly, the deciphering process can be started immediately. If the fragment offset field is not equal to zero in the first frame, then the first fragment of the original packet has not been received and the deciphering process cannot be started. Accordingly the frame must be sent to the fragment reordering block 22 to be processed. However, only a very small proportion of fragments are ever received out of order in the network.

The fragment reordering block 22 is in known form. In essence it comprises a set of buffers organised after the manner of (for example) TCP buffers which are employed to cope with reordering TCP segments. Other re-ordering algorithms for IP fragments are well described in the available literature. When a set of fragments has been reordered, the fragments may be sent in turn to the IPSec block 23 for processing.

When a frame has been deciphered, as described below, it may be forwarded directly as shown by arrow 25, without reassembly into an original packet. Reassembly may be performed at a later stage, such as at a destination host.

Figure 3:
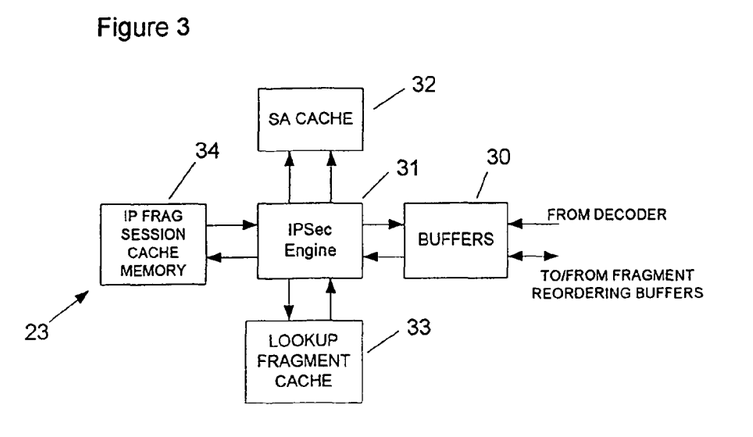
FIG. 3 illustrates in more detail a block which is part of the embodiment shown in FIG. 2.

FIG. 3 illustrates the IPSec block in more detail. It comprises buffers 30 for holding a frame while its header is parsed, an EPSec engine 31, a security association cache memory 32 (described in more detail with reference to FIG. 4), a lookup fragment cache 33 (described later) and an IP fragmenting session cache memory 34 (described in more detail with reference to FIGS. 6 and 7).

On the presumption that the fragment offset field OFFSET denotes that the first fragment of a sequence has been received first in its proper order, the decryption process can be started. The EP security block performs a search based on the IPSec protocol, the destination IP address and SPI fields to obtain the security association for that frame.

As explained above, the security association is a simplex contract. The parameters defined in this security association are typically which protocol is used, which transforms are used, what may be the encryption keys and the lifetime thereof, the sequence number, an anti-replay window, mode, a tunnel destination and the parameters for the MTU. Security associations are maintained in a security association database (SAD) which employs two tables to store the security associations. The 'outbound' security associations are stored in one table and the inbound security associations are stored in the other.

Figure 4:
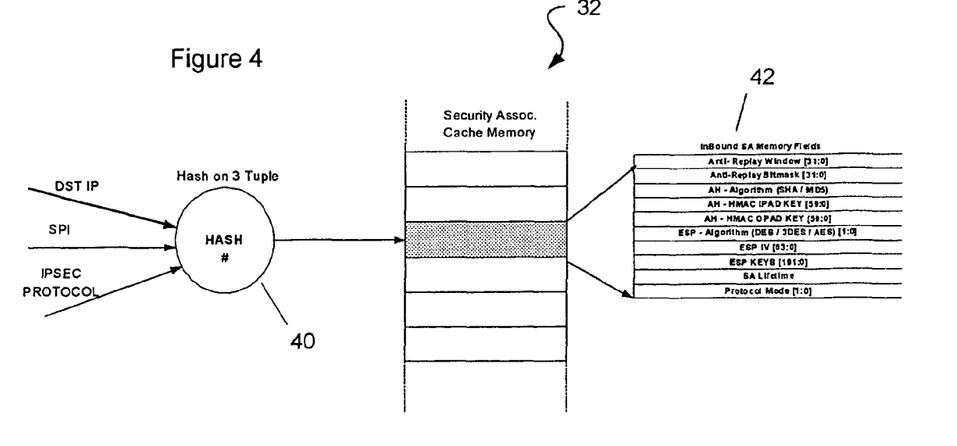
FIG. 4 illustrates a security association cache memory.

FIG. 4 illustrates in simplified manner the cache memory 32 which holds the inbound and outbound tables and also shows the recovery of a security association in response to a characteristic 3-tuple, i.e. the destination IP address IPDA, the SPI and the IPSec protocol.

In this example the search engine 40 for recovering from location 42 the security association (SA) from a 'key' represented by the 3-tuple of the IPDA, the SPI and the (IPSec) PROTOCOL as obtained from the frame is a hash search engine. Such a search engine typically performs exclusive-OR arithmetic on the 3-tuple to produce a reduced key which is used to access the memory. Since different 3-tuples might 'hash' to the same address, it is necessary to compare the 3-tuple with corresponding data in the SA entry to determine whether there is a match. If there is no match, a link allows access to another entry which is similarly checked and so on until the correct entry is found. It will be understood that since different keys may hash to the same address vector, if an entry already exists at the address defined by the vector, a new entry is created at a different address and is linked to the existing address by a pointer in the first entry. This linking of entries is characteristic of hash memories.

Hash memories of this general nature are described for example in U.S. patent to Sohor et al, U.S. Pat. No. 6,731,633 and prior copending application Ser. No. 09/286,469 filed Apr. 6, 1999 for Anne O'Connell.

However a different search engine may be used, such as for example a CAM (Content Addressable Memory) or a trie search engine.

Using the data associated with the correct entry for the security association, the IPSec engine will performs various checks. For example it will check the sequence number to see whether it is within a reply window. If the sequence number is outside the specified window the frame will be discarded. During this process the frame is buffered in buffer 25.

Using the retrieved security association, the IPSec engine 31 will now start to decode the frame. First, the authentication algorithm is applied to the entire frame. Then the frame is deciphered from the beginning of the payload data to the Next Header field (which delimits the end of the payload).

Figure 5:
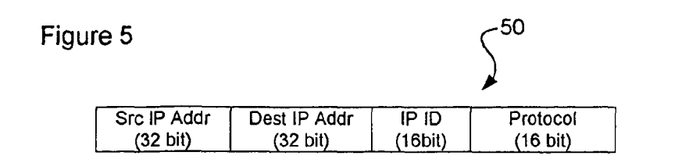
FIG. 5 illustrates a 4-tuple characteristic of a frame.

As the frame enters the IPSec block (e.g. while it is buffered) several items of data characteristic of the frame are extracted and stored in the lookup fragment cache 33, for transfer to the memory 34 at the end of a deciphering session. FIG. 5 illustrates the data 50 which will be extracted and subsequently employed to retrieve the 'cipher state' of the IPSec engine at the end of a fragment, so as to be able to decipher correctly a subsequent fragment which includes the aforementioned SA information from the same original frame. As is shown in FIG. 5, the data comprises the source IP address IPSA, the destination EP address IPDA, the IP ID identifier (which will be common to the various fragments of an original complete frame) and the protocol, i.e. the security protocol in operation.

Figure 6:
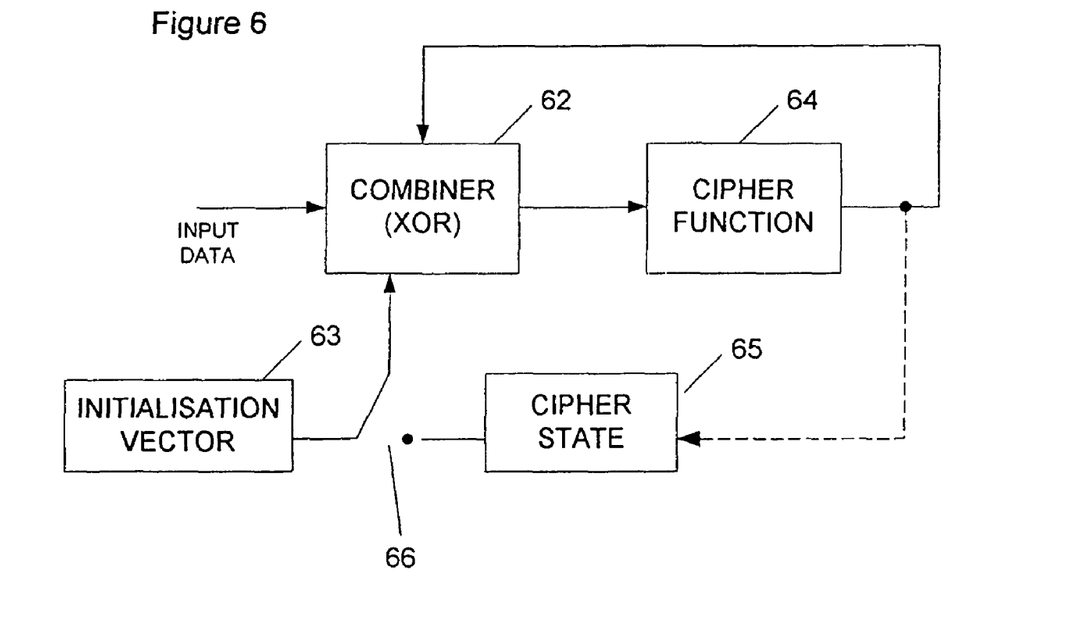
FIG. 6 is a schematic diagram illustrating the operation of a deciphering engine.

Although a variety of deciphering engines may be employed, a typical deciphering process proceeds as follows, as shown in FIG. 6.

When a first block of data is read in from the input buffers, it is combined, using an appropriate function, such as a set of XOR operations, by a combiner 62 with an initialisation vector 63 (which may be defined by the security association). Subsequent blocks of data are combined using the same function with a feedback from the output of the cipher function 64.

Accordingly, at the end of the deciphering session for the first fragment, the cipher engine will exhibit an output which can be used as the starting point for the deciphering process for the next frame which is a fragment of the original packet. This output is called herein the 'cipher state'; it is a multi-bit digital value or 'vector'. The 'switch' 66 denotes the use of the cipher state 65 in place of the initialisation vector 63.

At the end of the deciphering session for the first fragment the cipher state (65) is stored in the IP fragmenting session memory (34). The content of the entry (shown at 60 in FIGS. 7 and 8) includes the fields shown in FIG. 5, i.e. the fields retrieved from the fragment before the start of the deciphering, the cipher state and a TIMER field.

Figure 7:
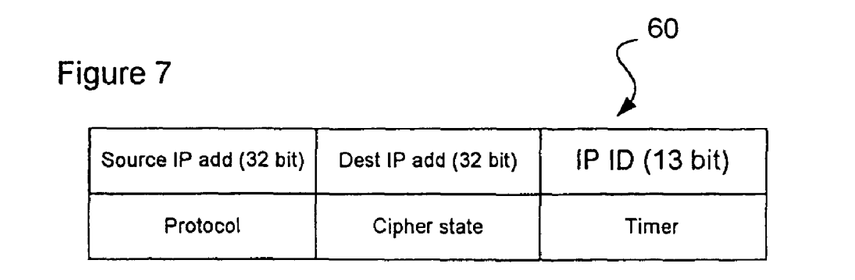
FIG. 7 is a diagram illustrating the content of an entry in an IP fragmenting session cache memory.
Figure 8:
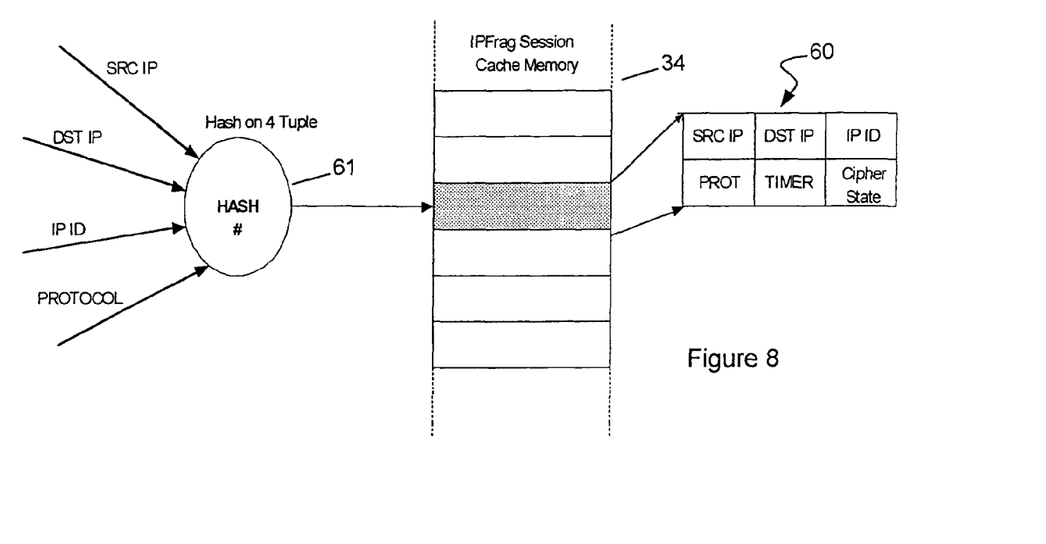
FIG. 8 is a diagram illustrating an IP fragmenting session cache memory.

The TIMER field is employed to 'age out' entries in the memory 34. The TIMER field is set when an entry is first made and is refreshed (i.e. reset to a datum) if the entry is accessed. It is routinely incremented and if it attains some predetermined value the entry is purged from the memory.

When the next fragment arrives in the IPSec block, the EPSec engine will determine whether there is a relevant entry in the lookup fragment cache 33 and a relevant entry in the memory 34. For this purpose it may employ a characteristic polytuple which includes at least the IP ID field. In this example it employs the 4-tuple of the IPSA, the IPDA, the IP ID and PROTOCOL fields to access the memory 34.

The accessing of the cache memory 34 may employ a hash search 61 as previously described with reference to FIG. 4. In such a case the entries in the memory 34 may include a pointer field which may point to a linked entry as previously described.

In this manner the succession of frames which represent fragments of the original packet may be deciphered without prior re-assembly of the packet.

Figure 9:
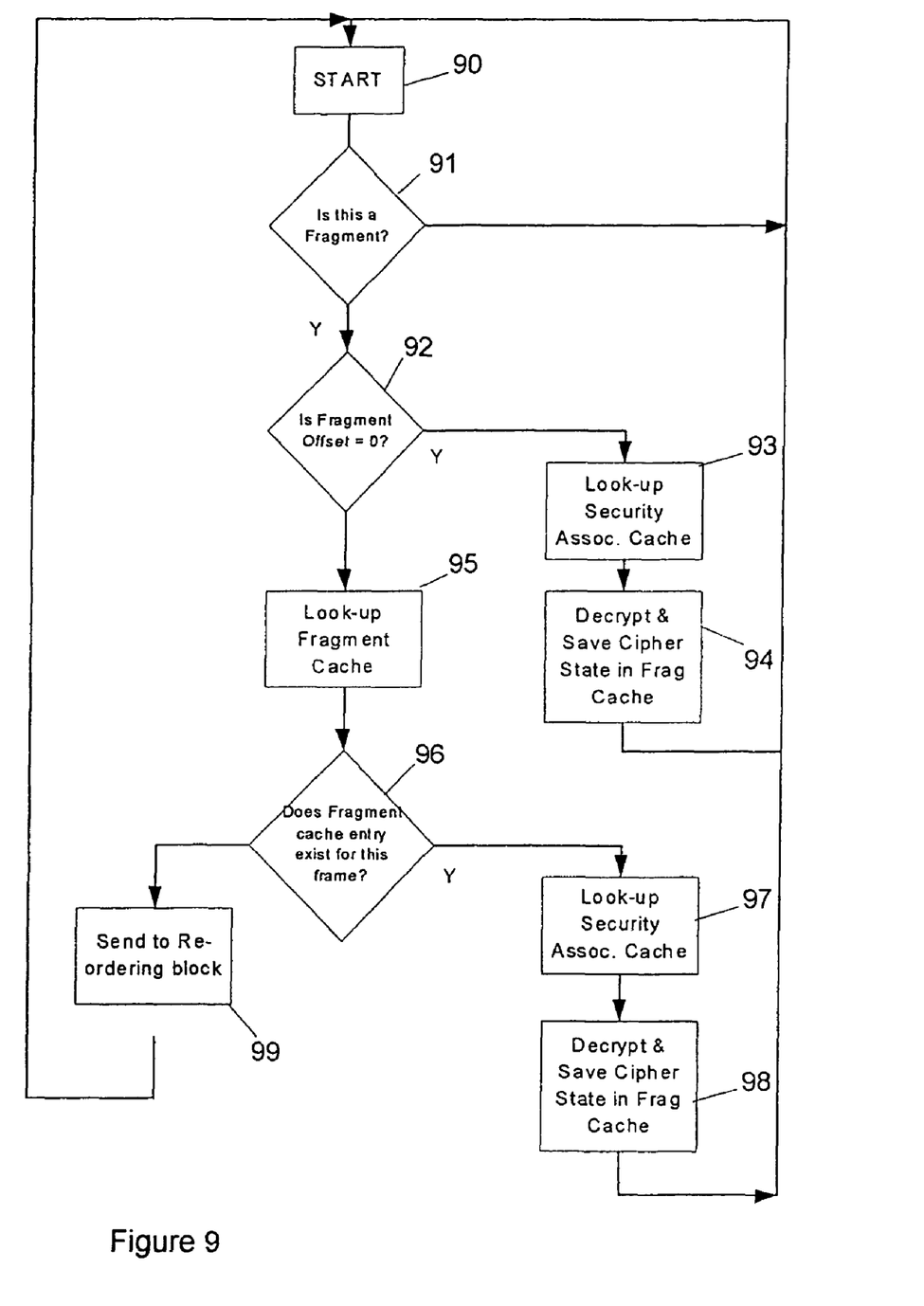
FIG. 9 is a schematic flow diagram of the method according to the invention.

FIG. 9 summarises the process performed by the IPSec engine. From a start 90, the first decision 91 is whether the incoming frame is a fragment. This is determined from the fragmentation flag in the IP header. If the frame is a fragment there is a determination 92 whether the fragment offset is zero. If the fragment is zero, it indicates that the frame is the first fragment and so the look-up security cache may be accessed (stage 93) as described with reference to FIG. 4. The payload is deciphered and the cipher state at the end of the deciphering session is saved in the fragmenting cache 34 (stage 94). This frame now may be forwarded. If at stage 92 it is determined that the fragment offset is not zero, i.e. the frame is a second or subsequent fragment of the original packet, the look-up fragment cache 33 is accessed (stage 95). If there is an entry corresponding to this frame (i.e. an entry which will be common to the frames of the original packet), stage 96, then the look-up security cache 34 is accessed as before (stage 97) and the fragment is deciphered, the cipher state being stored (stage 98) and the frame being forwarded. Stages 97 and 98 correspond to stages 93 and 94 but are performed on different frames.

If there is no entry in the fragment cache for a fragment which has a non-zero offset, then the frame is the fragment which has been received first in time but is not actually the first fragment of the original packet. In this, usually rare, event the frame has to be sent to the re-ordering block, stage 99.

The foregoing therefore describes the deciphering of the enciphered fragments of an original packet without requiring prior re-assembly. The invention has been particularly described with reference to IP frames and ESP encipherment, but the invention could be applied to other networking protocols and other enciphering protocols.

What is claimed is:

1. A method of deciphering enciphered frames which are fragments of an original packet, comprising:
    directing each of the frames to a deciphering process;
    storing at the termination of the deciphering process of a first frame a poly-tuple characteristic of said first frame against the cipher state of the deciphering process; and
    recommencing the deciphering process for the next frame at the said cipher state.

2. A method as in claim 1, including checking by reference to data from a header of said next frame that said next frame is a fragment of said original packet.

3. A method as in claim 2 wherein said deciphering process requires an initialising vector and a combination of data from said frame and an output vector and the deciphering process for said next frame employs said cipher state as said initialising vector.

4. A method as in claim 1 wherein said polytuple includes an identity field.

5. A method as in claim 3 wherein said polytuple includes network address data.

6. A method as in claim 1 wherein said frames conform to Internet Protocol encapsulating an encryption protocol.

7. A method as in claim 1 and further comprising examining said first frame to determine that it is the first fragment of said original packet before deciphering commences.

8. A method as in claim 7 and further comprising reordering said frames if said first frame is not the first fragment of said original packet.

9. A deciphering system for enciphered frames which are fragments of an original packet, said system being organized:
    to proceed with a deciphering session in respect of a first frame;
    to store at the end of said deciphering session a cipher state against a polytuple characteristic of the fragments; and
    in respect of the next fragment from the original packet, to recover said cipher state employing said polytuple as a search key and to commence a deciphering session in respect of the next fragment from said cipher state.

10. A system as in claim 9 wherein each deciphering session requires an initialising vector and a combination of data from said frame and an output vector and the system employs said cipher state as said initialising vector in the deciphering session for said nest frame.

11. A system as in claim 9 wherein said polytuple includes an identity field.

12. A system as in claim 11 wherein said polytuple includes network address data.

13. A system as in claim 9 wherein the system is organized to examine said first frame to determine whether it is the first fragment of said original packet.

14. A deciphering system for deciphering data frames which conform to a network protocol encapsulating an encryption protocol and constitute fragments of an original packet, the system including:

(a) a deciphering engine (b) a memory for the storage of security associations (c) a session memory for the storage of an output vector representing the state of a deciphering process at the end of a deciphering session the system being organized:

(i) to examine a frame and in response thereto to recover a security association;

(ii) to determine whether said frame is a first or subsequent fragment or the original packet (iii) when said frame is the first fragment, to commence a deciphering session for said frame in accordance with said security association and commencing from an initialising vector, and at the end of said session to store said output vector in said session memory; and (iv) when said frame is said subsequent fragment, to commence a deciphering session for said frame in accordance with said security association and commencing from said output vector.

15. A system as in claim 14 and organized to store said output vector against a polytuple characteristic of said fragments and to retrieve said output vector employing said polytuple as a search key.

16. A system as in claim 15 wherein said polytuple includes an identity field, a protocol field and network address data.

* * * * *

UNITED STATES PATENT AND TRADEMARK OFFICE
CERTIFICATE OF CORRECTION

PATENT NO. : 7,818,564 B2
APPLICATION NO. : 11/121231
DATED : October 19, 2010
INVENTOR(S) : Kevin Loughran et al.

Page 1 of 1

It is certified that error appears in the above-identified patent and that said Letters Patent is hereby corrected as shown below:

In column 9, line 3, in Claim 10, delete "nest" and insert -- next --, therefor.

In column 10, line 4, in Claim 14, delete "or" and insert -- of --, therefor.

Signed and Sealed this
Twenty-second Day of November, 2011

David J. Kappos
*Director of the United States Patent and Trademark Office*